United States Patent
Ludwig et al.

(10) Patent No.: US 10,153,956 B2
(45) Date of Patent: Dec. 11, 2018

(54) RATE CONTROL FOR APPLICATION PERFORMANCE MONITORING

(71) Applicant: Telefonaktiebolaget LM Ericsson (publ), Stockholm (SE)

(72) Inventors: Reiner Ludwig, Hürtgenwald (DE); Johnny Karlsen, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 15/119,572

(22) PCT Filed: Feb. 24, 2014

(86) PCT No.: PCT/EP2014/053514
§ 371 (c)(1),
(2) Date: Aug. 17, 2016

(87) PCT Pub. No.: WO2015/124213
PCT Pub. Date: Aug. 27, 2015

(65) Prior Publication Data
US 2017/0054616 A1     Feb. 23, 2017

(51) Int. Cl.
*H04L 12/26*     (2006.01)
*H04W 4/02*     (2018.01)

(52) U.S. Cl.
CPC .......... *H04L 43/0817* (2013.01); *H04L 43/06* (2013.01); *H04L 43/103* (2013.01); *H04W 4/02* (2013.01); *H04L 43/16* (2013.01)

(58) Field of Classification Search
CPC ... H04L 43/0817; H04L 43/06; H04L 43/103; H04W 4/02
See application file for complete search history.

(56) References Cited

U.S. PATENT DOCUMENTS

| | | | |
|---|---|---|---|
| 2001/0049263 A1* | 12/2001 | Zhang | G06F 8/65 455/67.11 |
| 2008/0123544 A1* | 5/2008 | Tujkovic | H04L 43/06 370/252 |

(Continued)

FOREIGN PATENT DOCUMENTS

| | | |
|---|---|---|
| EP | 1716714 B1 | 1/2008 |
| WO | 2002073887 | 9/2002 |
| WO | 2005032185 A1 | 4/2005 |

OTHER PUBLICATIONS

3rd Generation Partership Project, "3rd Generation Partnership Project; Technical Specification Group Services and System Aspects; Telecommunication management; Key Performance Indicators (KPI) for UMTS and GSM (Release 11)", Technical Specification, 3GPP TS 32.410 V11.0.0, Sep. 1, 2012, pp. 1-27, 3GPP, France.

(Continued)

*Primary Examiner* — Chi H Pham
*Assistant Examiner* — Weibin Huang
(74) *Attorney, Agent, or Firm* — Coats & Bennett, PLLC (57) ABSTRACT

An application executed on a plurality of wireless communication devices (100) measures a performance indicator. The application sends reports (40) of the performance indicator to a server (150). On the basis of the reports (40), the server determines a rate of reporting the performance indicator and sends an indication (50) of the rate of reporting to the application executed on at least some of the wireless communication devices (100). According to the indicated rate of reporting, the application on these wireless communication devices controls a timing of measuring the performance indicator and sending the reports (40) to the server (150).

34 Claims, 7 Drawing Sheets

(56) References Cited

U.S. PATENT DOCUMENTS

| | | | |
|---|---|---|---|
| 2009/0069007 A1 | 3/2009 | Xiao | |
| 2010/0020717 A1 | 1/2010 | McGregor et al. | |
| 2011/0098973 A1* | 4/2011 | Seidman | G06F 11/0709 702/179 |
| 2011/0201347 A1* | 8/2011 | Abraham | H04W 48/18 455/456.1 |
| 2013/0080761 A1* | 3/2013 | Garrett | G06F 11/3414 713/100 |
| 2013/0242787 A1* | 9/2013 | Sun | H04W 24/10 370/252 |
| 2013/0322277 A1* | 12/2013 | Vanganuru | H04W 24/08 370/252 |
| 2014/0164364 A1* | 6/2014 | Cosgrove | G06F 17/3053 707/723 |
| 2014/0365111 A1* | 12/2014 | McClernon | G01C 21/20 701/409 |
| 2015/0371521 A1* | 12/2015 | Braiman | G08B 21/0446 340/10.1 |

OTHER PUBLICATIONS

3rd Generation Partership Project, "3rd Generation Partnership Project; Technical Specification Group Services and System Aspects; Telecommunication management; Key Performance Indicators (KPI) for Evolved Universal Terrestrial Radio Access Network (E-UTRAN): Definitions(Release 11)", Technical Specification, 3GPP TS 32.450 V11.0.0, Sep. 1, 2012, pp. 1-17, 3GPP, France.

* cited by examiner

RATE CONTROL FOR APPLICATION PERFORMANCE MONITORING

TECHNICAL FIELD

The present invention relates to methods for performance monitoring and to corresponding devices.

BACKGROUND

In wireless communication networks, e.g., cellular networks such as specified by 3GPP ($3^{rd}$ Generation Partnership Project), it is know to use performance indicators for measuring performance. For example, 3GPP TS 32.410 V11.0.0 (2012-09) specifies Key Performance Indicators (KPIs) which may be used for performance monitoring in the Universal Mobile Telecommunications System (UMTS) and Global System for Mobile Communications (GSM) radio technologies and 3GPP TS 32.450 V11.0.0 (2012-09) specifies KPIs which may be used for performance monitoring in an Evolved UMTS Terrestrial Radio Access Network (E-UTRAN) of the LTE (Long Term Evolution) radio technology.

Further, EP 1 766 714 B1 describes that performance statistics on an application level may also be generated using transaction statistics which are recorded by each mobile terminal and then periodically transmitted to a central interface unit for collection and evaluation.

However, when using such reporting of statistics by a wireless communication device it may be desirable to avoid excessive reporting activity of the wireless communication devices, in particular because the reporting and the performance measurements tend to increase usage of radio resources and power consumption. On the other hand, a low reporting activity of the wireless communication devices may result in an insufficient data basis for desired performance evaluations.

Accordingly, there is a need for techniques which allow for efficiently monitoring the performance of an application which is executed on wireless communication devices.

SUMMARY

According to an embodiment of the invention, a method of performance monitoring is provided. According to the method, a server receives reports of an performance indicator as measured by an application executed on a plurality of wireless communication devices. On the basis of the received reports, the server determines a rate of reporting the performance indicator. Further, the server sends an indication of the rate of reporting to the application executed on at least some of the wireless communication devices.

According to a further embodiment of the invention, a method of performance monitoring is provided. According to the method, an application executed on a wireless communication device measures a performance indicator. The application sends reports of the performance indicator to a server. Further, the application receives an indication of a rate of reporting the performance indicator from the server. According to the indicated rate of reporting, the application controls a timing of measuring the performance indicator and sending the reports to the server.

According to a further embodiment of the invention, a server is provided. The server comprises an interface for communicating with a plurality of wireless communication devices and at least one processor. The at least one processor is configured to receive reports of an performance indicator as measured by an application executed on the wireless communication devices. Further, the at least one processor is configured to determine, on the basis of the received reports, a rate of reporting the performance indicator. Further, the at least one processor is configured to send an indication of the rate of reporting to the application executed on at least some of the wireless communication devices.

According to a further embodiment of the invention, a wireless communication device is provided. The wireless communication device comprises a memory storing program code of an application. Further, the wireless communication device comprises at least one processor. The at least one processor is configured to execute the program code of the application. Execution of the program code of the application causes the at least one processor to measure a performance indicator. Further, execution of the program code of the application causes the at least one processor to send reports of the performance indicator to a server. Further, execution of the program code of the application causes the at least one processor to receive an indication of a rate of reporting the performance indicator from the server. Further, execution of the program code of the application causes the at least one processor to control, according to the indicated rate of reporting, a timing of said measuring the performance indicator and sending the reports to the server.

According to a further embodiment of the invention, a computer program or computer program product is provided, e.g., in the form of a non-transitory storage medium, which comprises program code to be executed by at least one processor of a server. Execution of the program code causes the at least one processor to receive reports of an performance indicator as measured by an application executed on a plurality of wireless communication devices. Further, execution of the program code causes the at least one processor to determine, on the basis of the received reports, a rate of reporting the performance indicator. Further, execution of the program code causes the at least one processor to send an indication of the rate of reporting to the application executed on at least some of the wireless communication devices.

According to a further embodiment of the invention, a computer program or computer program product is provided, e.g., in the form of a non-transitory storage medium, which comprises program code of an application to be executed by at least one processor of a server. Execution of the program code of the application causes the at least one processor to measure a performance indicator. Further, execution of the program code of the application causes the at least one processor to send reports of the performance indicator to a server. Further, execution of the program code of the application causes the at least one processor to receive an indication of a rate of reporting the performance indicator from the server. Further, execution of the program code of the application causes the at least one processor to control, according to the indicated rate of reporting, a timing of said measuring the performance indicator and sending the reports to the server.

Details of such embodiments and further embodiments will be apparent from the following detailed description of embodiments.

DETAILED DESCRIPTION OF EMBODIMENTS

In the following, concepts according to embodiments of the invention will be explained in more detail by referring to the accompanying drawings. The illustrated concepts relate to monitoring performance of an application which is executed on a plurality of wireless communication devices. The wireless communication devices may for example be mobile phones, smartphones, tablet computers, or portable personal computers. The application can for example be a social media application or a messaging application. In the illustrated embodiments, it is assumed that the application interacts with an application server, to which the wireless communication devices may connect via one or more wireless communication networks. Accordingly, the wireless communication devices will in the following also be referred to as client devices. The wireless communication networks may be based one various types of radio technology, e.g., the LTE radio technology, UMTS radio technology, or GSM radio technology specified by 3GPP. Further, also other types radio technology could be used, such as the CDMA2000 or Wireless Local Area Network (WLAN) radio technologies or other non-3GPP wireless technologies.

In the concepts as illustrated herein, the application executed on the client devices measures a performance indicator and regularly sends reports of the performance indicator to a server. This server is typically implemented separately from the application server. On the basis of the reports, the server determines a rate of reporting the performance indicator and indicates this rate to at least some of the client devices. The application on the client devices then applies this rate by controlling the timing of measuring the performance indicator and sending the reports according to the indicated rate.

The reports of the performance indicator may also include meta data related to the client device providing the report. The meta data may for example indicate a location of the client device providing the report, e.g., in terms of cell identity (ID), time zone, geographical coordinates, geographical region, or the like. Further, the meta data may indicate a device type, e.g., in terms of a model designation, manufacturer designation, model number, and/or device category defined by device transmission capabilities or the like. Further, the meta data may indicate a type of operating software of the client device. Examples of such operating software are the Android operating system developed by the Open Handset Alliance, the iOS operating system developed by Apple Inc., and the Windows Phone operating system developed by Microsoft Inc. The meta data may also indicate a version of such operating software. Further, the meta data may indicate information related to network connectivity of the client device providing the report. For example, the meta data may indicate a radio channel quality experienced by the client device, a radio technology type utilized by the client device, or an operator of a wireless communication network utilized by the client device.

The meta data may be used for defining subgroups of the client devices. For example, such subgroup could correspond to all client devices associated with a certain cell ID of a wireless communication network, all client devices located in a certain geographical region, or all client devices using a certain version of operating software. Further, any combination of such attributes could be used for defining a subgroup. The server may then determine the rate of reporting the performance indicator individually for each subgroup. Such subgroup may include one or more client devices.

The rate of reporting may be determined in accordance with a certain target rate of receiving the reports of the performance indicator. For example, an overall target rate may be defined for the reception of the reports from all client devices at the server. Since the usage of the client devices and also of the application itself may vary over time and between the different client devices, also the overall rate at which the reports are received by the server may vary. If the overall rate as measured at the server is lower than the target rate, the server may determine a higher rate of reporting the performance indicator and indicate this higher rate of reporting to the client devices. The application executed on the individual client devices will then adapt the timing of measuring the performance indicator and sending the reports accordingly. Similarly, if the overall rate as measured at the server is higher than the target rate, the server may determine a lower rate of reporting the performance indicator and indicate this lower rate of reporting to the client devices, causing the application executed on the individual client devices to adapt the timing of measuring the performance indicator and sending the reports accordingly. In this way, the server may ensure a sufficient data basis for evaluations on the basis of the performance indicators and at the same time avoid excessive measurement and reporting activity.

Further, target rates may also be defined on a subgroup level. For example, a target rate could be defined for the reception of reports from the client devices associated with a certain cell ID, e.g., in terms of a target rate per cell ID. Further, a target rate could be defined for the reception of reports from the client devices using a certain type of operating software or version of such operating software. If the rate of receiving reports from the client devices of such subgroup deviates from the target rate defined for this subgroup, the rate of reporting for this subgroup may be adapted accordingly. This may be used to ensure that different kinds of client devices or client devices at various locations are sufficiently represented by the reported performance indicators. The subgroups may be flexibly defined using one or more of the above mentioned information elements indicated in the meta data.

Figure 1:
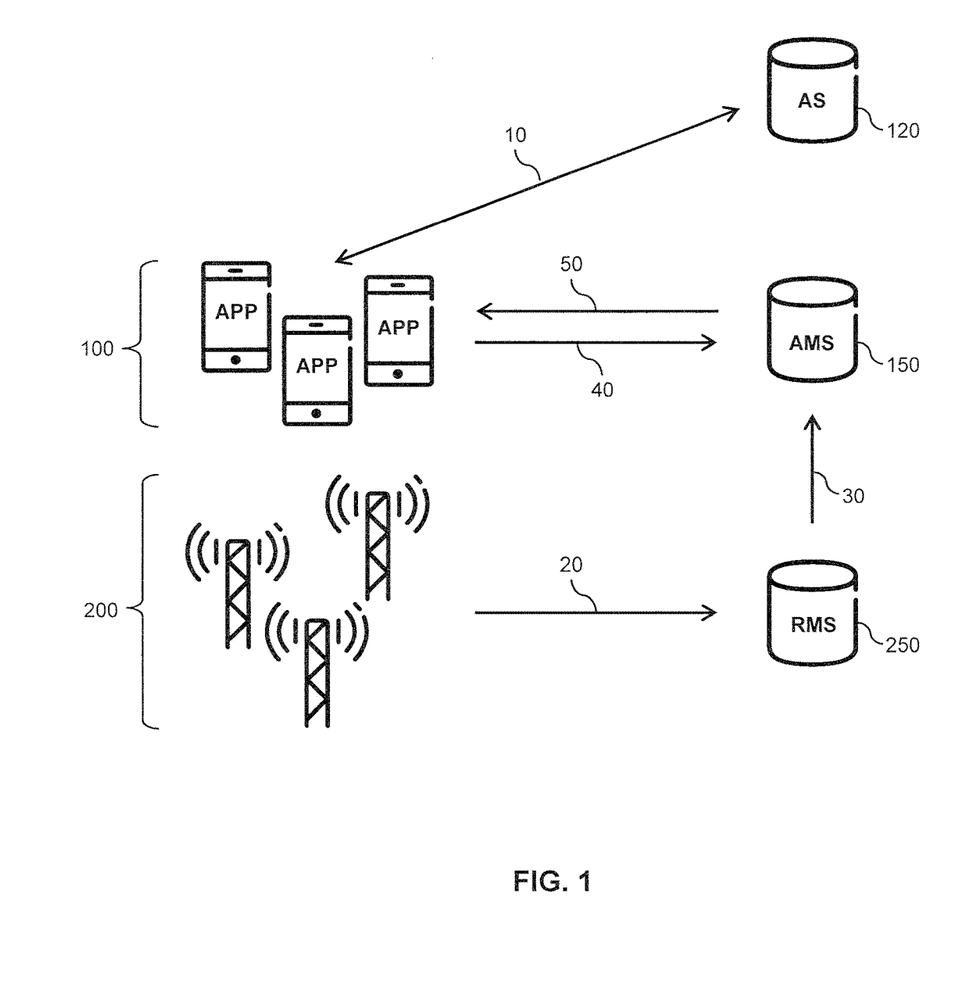
FIG. 1 schematically illustrates an exemplary scenario in which performance of an application is monitored according to an embodiment of the invention.

FIG. 1 shows an exemplary scenario for implementation of performance monitoring according to the concepts as outlined above. In particular, FIG. 1 shows a plurality of client devices 100 which may connect to cells 200 of one or more wireless communication networks. Each client device 100 executes an application, e.g., a social media application or messaging application. Via such wireless communication network, the application executed on the individual client devices 100 interacts with an application server (AS) 120. This typically involves transactions in which data are sent from the AS 120 to the application on the client device 100 and transactions in which data are sent from the application on the client device 100 to the AS 120, as illustrated by arrow 10.

Such transactions and other operations of the application executed on the client devices 100 may be subject to performance monitoring. In particular, a performance indicator may be defined to quantify the performance with respect to certain transactions or operations of the application. Examples of such performance indicator are a number of incompletely transferred bytes of a failed download, a number of incompletely transferred bytes of an upload, a number of bytes of an successful download, a number of bytes of a successful upload, a download time or speed for a picture or video or an upload time or speed for a picture or video. Further examples of such performance indicator are a number of occasions in which a streamed video freezes, a number of switching between encoding rates by a video streaming source, e.g., to adapt to changes in network throughput or delay, or a time-to-interaction parameter representing a time interval until a user can interact with an element of a user interface, even though not all content may be downloaded yet.

Each client device 100 measures the performance indicator and sends reports 40 of the performance indicator to an application-level measurement server (AMS) 150. The reports are sent in a regular manner, according to a reporting rate configured in each client device 100. Each report 40 may also include meta data with one or more of the above-mentioned information elements. The AMS 150 collects the reported performance indicators for further evaluation. For example, such further evaluation may involve correlation with a Quality of Service (QoS) heat map 30 as provided by a radio access network level measurement server (RMS) 250. By way of example, the RMS 250 may generated the QoS heat map 30 by collecting and evaluating KPIs 20 reported by the wireless communication network(s), e.g., using KPIs as for example defined in 3GPP TS 32.410 V11.0.0 (2012-09) or 3GPP TS 32.450 V11.0.0 (2012-09).

The AMS 150 further measures a rate at which the reports 40 are received from the client devices 100. As mentioned above, the AMS 150 may measure such rate as an overall rate for all client devices 100 and may measure such rate for one or more subgroups of the client devices 100. The subgroups may be defined on the basis of the meta data in the reports 40. The AMS 150 may then perform a comparison of the measured rate to a target rate. The target rate can for example be defined in terms of a minimum limit, a maximum limit, and/or a nominal value. Depending on the comparison of the measured rate to a target rate, the AMS 150 determines a new reporting rate for at least some of the client devices 100 and sends an indication 50 of this new reporting rate to these client devices 100, which then adapt their configuration to measure the performance indicator and send the reports 40 according to the new reporting rate. In some implementations, the indication 50 may also be used to configure the client devices 100 with respect to the type of meta data to be included into the reports 40.

In the implementation of FIG. 1, it is assumed that for transmitting the indication 50 an interface is provided between the AMS 150 and the application executed on the client devices 100. For example, the application on each client device 100 may be provided with a configuration interface to accept configuration commands directly from the AMS 150.

Figure 2:
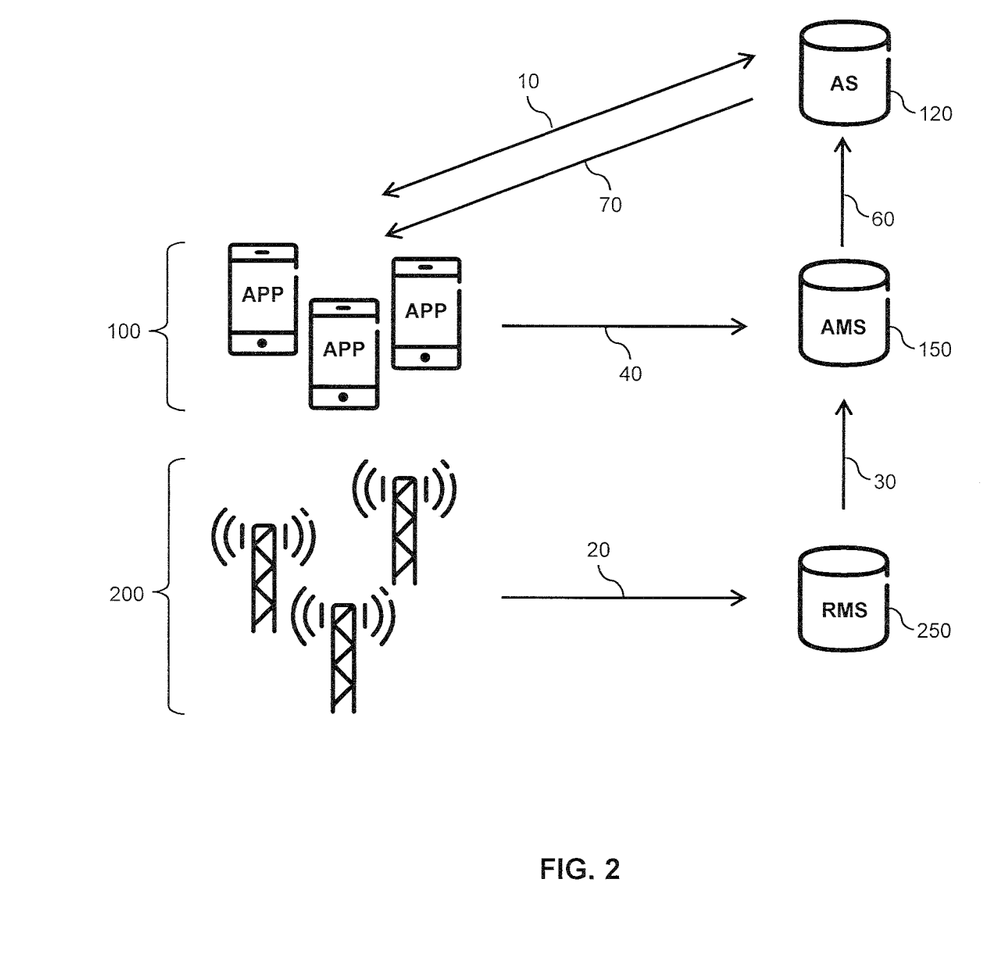
FIG. 2 schematically illustrates a further exemplary scenario in which performance of an application is monitored according to an embodiment of the invention.

An alternative implementation is illustrated in FIG. 2. The implementation of FIG. 2 generally corresponds to that of FIG. 1. However, rather than providing the interface between the AMS 150 and the application executed on the client devices 100, in this implementation the AMS 150 indicates the new reporting rate via the AS 120. In particular, the AMS 150 sends a first indication 60 of the reporting rate to the AS 120, and the AS 120 sends a second indication 70 of the reporting rate to the client devices 100. In this case, the application on each client device 100 may be provided with a configuration interface to accept configuration commands from the AS 120, and these configuration commands may forward the new reporting rate indicated by the AMS 150.

Figure 3:
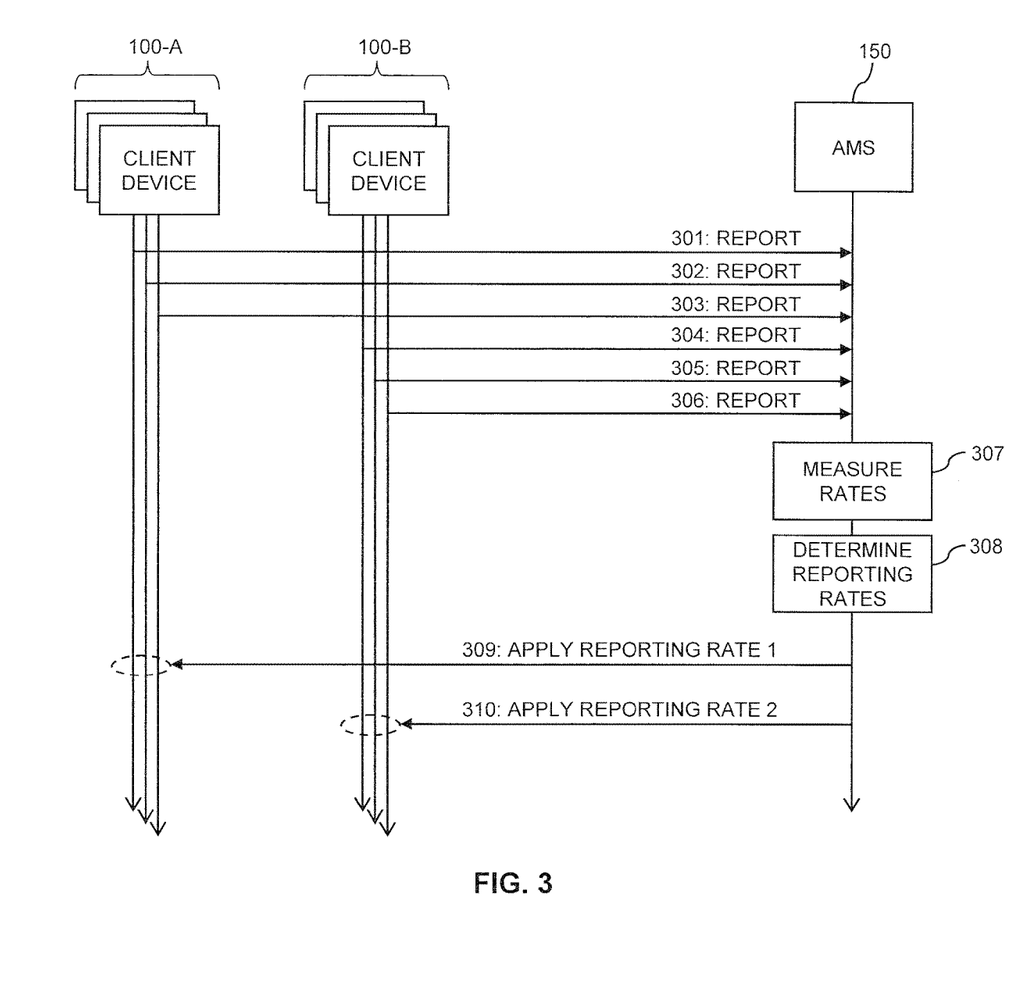
FIG. 3 schematically illustrates exemplary processes according to an embodiment of the invention, in which a rate of reporting a performance indicator is controlled for different subgroups of wireless communication devices.

FIG. 3 shows exemplary processes in which the reporting rate is determined individually for different subgroups. By way of example, the processes of FIG. 3 assume that a first subgroup 100-A and a second subgroup 100-B of client devices 100 are defined within the overall group of client devices 100. For example, the first subgroup 100-A may differ from the second subgroup 100-B with respect to a location of the client devices 100. The location may be defined in terms of cell ID, time zone, geographical coordinates, geographical region, or the like. According to another example, the first subgroup 100-A may differ from the second subgroup 100-B with respect to the device type of the client devices 100 or with respect to the type or version of operating software of the client devices 100. According to a further example, the first subgroup 100-A may differ from the second subgroup 100-B with respect to the radio connectivity of the client devices, e.g., with respect to the utilized radio technology, operator of the utilized wireless communication network, or currently experienced radio channel quality.

As illustrated, in the processes of FIG. 3 each client device 100 sends a reports 301, 302, 303, 304, 305, 306 of the performance indicator to the AMS 150. The reports 301, 302, 303, 304, 305, 306 are assumed to include meta data which allow the AMS 150 to identify the subgroup 100-A, 100-B to which the client device 100 providing a certain report 301, 302, 303, 304, 305, 306 belongs. The AMS 150 may select the information elements of the meta data to be used for classification of the client devices 100 into the subgroups 100-A, 100-B, i.e., may define the subgroups 100-A, 100-B on the basis of the meta data in the reports 301, 302, 303, 304, 305, 306.

As illustrated by step 307, the AMS 150 may measure rates at which the reports 301, 302, 303, 304, 305, 306 are received by the AMS 150. In particular, the AMS 150 may measure the overall rate at which the reports 301, 302, 303, 304, 305, 306 are received from all client devices 100, and may further measure the rate at which the reports 301, 302, 303 are received from the client devices 100 of the first subgroup 100-A and the rate at which the reports 304, 305, 306 are received from the client devices 100 of the second subgroup 100-B.

On the basis of the measured rates, the AMS 150 may then determine the reporting rates individually for the different subgroups 100-A, 100-B, as indicated by step 308. In particular, the AMS 150 may determine a first reporting rate for the first subgroup 100-A and a second reporting rate for the second subgroup 100-B. For this purpose, the AMS 150 may consider multiple target rates. In particular, the AMS 150 may compare the measured overall rate to an overall target rate and determine the first and second reporting rates according to this comparison. For example, if the measured overall rate exceeds the overall target rate, the AMS 150 may determine at least one of the first and second reporting rates to be smaller than the reporting rates currently applied by the client devices of the first and second subgroups 100-A, 100-B. Similarly, if the measured overall rate is lower than the overall target rate, the AMS 150 may determine at least one of the first and second reporting rates to be higher than the reporting rates currently applied by the client devices of the first and second subgroups 100-A, 100-B. Further, the AMS 150 may compare the measured rate at which the reports 301, 302, 303 are received from the client devices 100 of the first subgroup 100-A to a first target rate defined for this subgroup 100-A and determine the first reporting rate according to this comparison. For example, if the measured rate for the first subgroup 100-A exceeds the first target rate, the AMS 150 may determine the first reporting rate to be smaller than the reporting rate currently applied by the client devices 100 of the first subgroup 100-A. Similarly, if the measured rate for the first subgroup 100-A is lower than the first target rate, the AMS 150 may determine the first reporting rate to be higher than the reporting rate currently applied by the client devices 100 of the first subgroup 100-A. Further, the AMS 150 may compare the measured rate at which the reports 304, 305, 306 are received from the client devices 100 of the second subgroup 100-B to a second target rate defined for this subgroup 100-B and determine the second reporting rate according to this comparison. For example, if the measured rate for the second subgroup 100-B exceeds the second target rate, the AMS 150 may determine the second reporting rate to be smaller than the reporting rate currently applied by the client devices 100 of the second subgroup 100-B. Similarly, if the measured rate for the second subgroup 100-B is lower than the second target rate, the AMS 150 may determine the second reporting rate to be higher than the reporting rate currently applied by the client devices 100 of the second subgroup 100-B.

Accordingly, in the process of determining the reporting rates at step 308, various target rates may be considered and the first and second reporting rates may be determined with the aim of minimizing the deviation of the measured rates from the target rates, i.e., the target rates may define nominal values of an adaptation process. In some implementations, the target rates may also define maximum and/or minimum limit values and the first and second reporting rates may be determined with the aim of keeping the measured rates below such maximum limit and/or above such minimum limit. In any case, the determination may also further consider the size of the subgroup 100-A, 100-B, i.e., a number of the client devices 100 in the subgroup 100-A, 100-B. In particular, since the measured rates are determined with respect to multiple reporting client devices 100 but the first or second reporting rates are applied by the individual client devices 100, a subgroup 100-A, 100-B with a small number of client devices 100 may require a higher reporting rate to achieve the same measured rate than a subgroup with a higher number of client devices 100.

Having determined the first and second reporting rates, the AMS 150 sends an indication 309 of the first reporting rate and an indication 310 of the second reporting rate to the client devices 100 of the subgroups 100-A, 100-B. As mentioned in connection with FIGS. 1 and 2, this may be accomplished indirectly via the AS 120 (not illustrated in FIG. 3) or directly, without involving the AS 120. Various mechanisms may be used for addressing the client devices 100 of the different subgroups 100-A, 100-B. In the exemplary scenario of FIG. 3, it is assumed that each indication 309, 310 is transmitted to all client devices 100 of the subgroups 100-A, 100-B, e.g., using a broadcast transmission mode, and that the indications 309, 310 include one or more parameters to indicate the subgroup 100-A, 100-B they are addressed to. Each individual client device 100 may then determine whether it is a member of the subgroup 100-A, 100-B to which the indication is addressed. By way of example, such parameters could indicate a cell ID to specify that the indication 309, 310 is addressed to all client devices 100 associated with this cell ID, and each individual client device 100 could compare this indicated cell ID to the cell ID it is currently associated to, to thereby determine whether it is member of the subgroup 100-A, 100-B to which the indication 309, 310 is addressed. Other addressing mechanisms may for example involve that the AMS 150 identifies the client devices 100 of a particular subgroup 100-A, 100-B and sends the indication 309, 310 with the reporting rate for this subgroup 100-A, 100-B only to these identified client devices 100, e.g., using a multicast or unicast transmission mode.

Having received the indication 309, the client devices 100 of the first subgroup 100-A apply the indicated first reporting rate for the measurement of the performance indicator and sending the reports of the performance indicator. Similarly, having received the indication 310, the client devices 100 of the second subgroup 100-B apply the indicated second reporting rate for the measurement of the performance indicator and sending the reports of the performance indicator.

Figure 4:
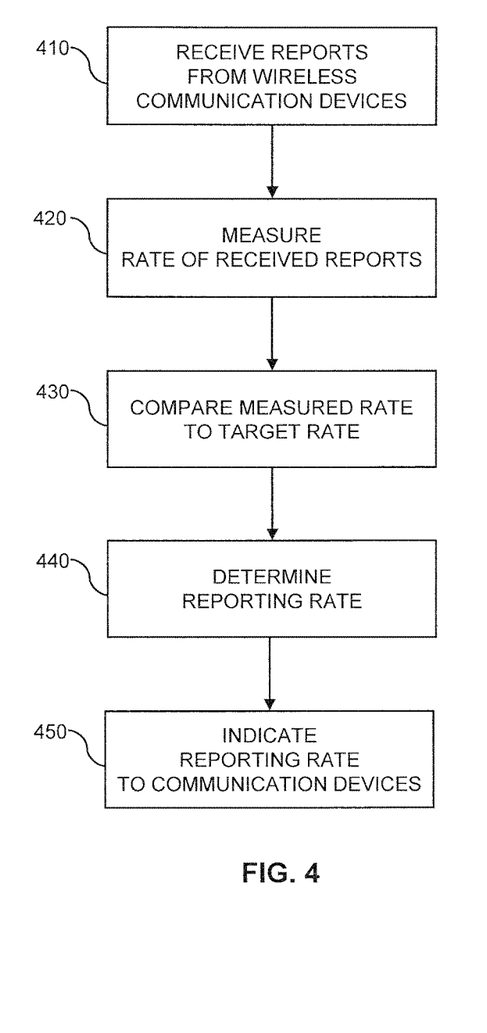
FIG. 4 shows a flowchart for illustrating a method according to an embodiment of the invention, which may be implemented by a server.

FIG. 4 shows a flowchart for illustrating a method of monitoring the performance of an application. The method may be used for implementing the above concepts in a server, e.g., in the AMS 150. If a processor based implementation of the server is used, the steps of the method may be performed by one or more processors of the server. For this purpose, the processor(s) may execute correspondingly configured program code. Further, at least some of the corresponding functionalities may be hardwired in the processor(s).

At step 410, the server receives reports of an performance indicator. The performance indicator was measured by the application which is executed on a plurality of wireless communication devices, such as the above-mentioned client devices 100. The performance indicator may for example be defined in terms of a number of incompletely transferred bytes of a failed download, a number of incompletely transferred bytes of an upload, a number of bytes of an successful download, a number of bytes of a successful upload, a download time or speed for a picture or video or an upload time or speed for a picture or video.

Each report may comprise meta data related to the wireless communication device providing the report. For example, the meta data may include an indication of a location of the wireless communication device providing the report, e.g., in terms of cell ID, time zone, geographical coordinates, geographical region, or the like. In addition or alternatively, the meta data may include an indication of a type of operating software of the wireless communication device providing the report. Optionally, also an indication of the version of the operating software may be included in the meta data. In addition or alternatively, the meta data may include an indication of a radio channel quality experienced by the wireless communication device providing the report. In addition or alternatively, the meta data may include an indication of a radio technology type utilized by the wireless communication device providing the report. Such radio technology types may for example be LTE, UMTS, GSM, GPRS, CDMA2000, or WLAN or other non-3GPP wireless technologies. In addition or alternatively, the meta data may include an indication of an operator of a wireless communication network utilized by the wireless communication device providing the report. Here, it is to be understood that such radio connectivity related information typically pertains to a radio connection which is utilized for downlink or uplink communication by the application. In addition or alternatively, the meta data may include an indication of a device type of the wireless communication device providing the report, e.g., in terms of a device designation, manufacturer designation, model number, and/or device category defined by device transmission capabilities or the like.

At step 420, the server may measure one or more rates at which the reports are received by the server. For example, the server may measure an overall rate at which the reports are received from all the wireless communication devices. Further, the server may measure a rate at which the reports are received from a subgroup of the wireless communication devices. The server may determine the subgroup on the basis of the meta data indicated in the received reports.

At step 430, the server may compare the rate(s) as measured at step 420 to one or more target rates. If the rates are measured with respect to subgroups, such target rates may be defined per subgroup. The target rates may correspond to nominal values to which the measured rates are adapted or may correspond to maximum and/or minimum limits.

At step 440, the server determines one or more rates of reporting the performance indicator. This is accomplished on the basis of the reports received at step 410. In particular, the rate(s) of reporting may be determined on the basis of the rate(s) as measured at step 420 and the comparison of step 430. For example, if the comparison indicates that the measured rate exceeds the target value, the rate of reporting may be set to a value which is lower than the currently applied rate of reporting. Similarly, if the comparison indicates that the measured rate is lower than the target value, the rate of reporting may be set to a value which is higher than the currently applied rate of reporting. The rate(s) of reporting may be determined per subgroup, e.g., as explained in connection with the example of FIG. 3.

At step 450, the server sends an indication of the rate(s) of reporting to the application executed on at least some of the wireless communication devices. This can be accomplished directly, e.g., as illustrated in the example of FIG. 1, or can be accomplished indirectly, e.g., as illustrated in the example of FIG. 2. If the determination of the rate of reporting at step 440 pertains to a certain subgroup, the server indicates the rate of reporting to the application executed on the wireless communication devices of this subgroup.

Figure 5:
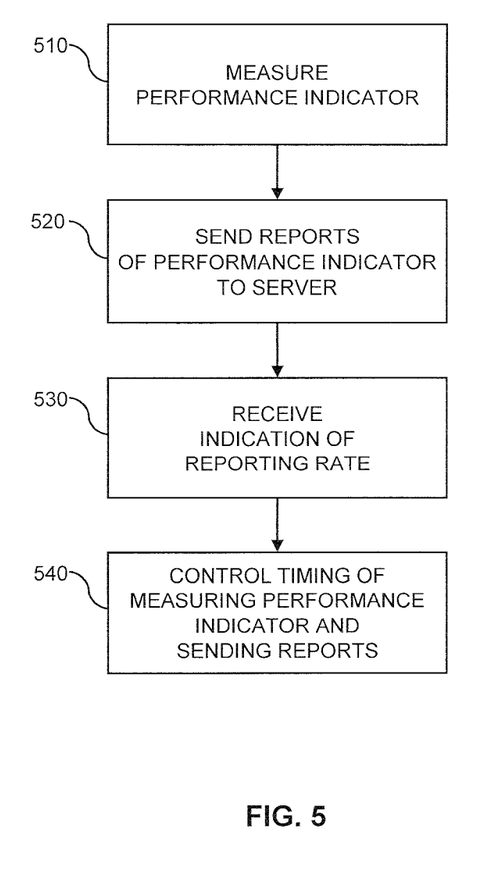
FIG. 5 shows a flowchart for illustrating a method according to an embodiment of the invention, which may be implemented by a wireless communication device.

FIG. 5 shows a flowchart for illustrating a method of monitoring the performance of an application. The method may be used for implementing the above concepts in a wireless communication device, e.g., in one of the client devices 100. If a processor based implementation of the wireless communication device is used, the steps of the method may be performed by one or more processors of the wireless communication device. In particular, the steps may be performed by execution of program code of the application by the processor(s).

At step 510, the application executed on the wireless communication device measures a performance indicator. The performance indicator may for example be defined in terms of a number of incompletely transferred bytes of a failed download, a number of incompletely transferred bytes of an upload, a number of bytes of an successful download, a number of bytes of a successful upload, a download time or speed for a picture or video or an upload time or speed for a picture or video.

At step 520, the sends reports of the performance indicator to a server. Each report may comprise meta data related to the wireless communication device. For example, the meta data may include an indication of a location of the wireless communication device, e.g., in terms of cell ID, time zone, geographical coordinates, geographical region, or the like. In addition or alternatively, the meta data may include an indication of a type of operating software of the wireless communication device. Optionally, also an indication of the version of the operating software may be included in the meta data. In addition or alternatively, the meta data may include an indication of a radio channel quality experienced by the wireless communication device. In addition or alternatively, the meta data may include an indication of a radio technology type utilized by the wireless communication device. Such radio technology types may for example be LTE, UMTS, GSM, GPRS, CDMA2000, or WLAN or other non-3GPP wireless technologies. In addition or alternatively, the meta data may include an indication of an operator of a wireless communication network utilized by the wireless communication device. Again, it is to be understood that such radio connectivity related information typically pertains to a radio connection which is utilized for downlink or uplink communication by the application. In addition or alternatively, the meta data may include an indication of a device type of the wireless communication device, e.g., in terms of a device designation, manufacturer designation, model number, and/or device category defined by device transmission capabilities or the like. It should be noted that such meta data may vary over time. For example, the wireless communication device may change its location or the radio connectivity of the wireless communication device may change. In such cases, the meta data may be determined to represent information pertaining to a time at which the reported performance indicator is measured.

At step 530, the application receives an indication of a rate of reporting the performance indicator from the server. This can be accomplished directly, e.g., as illustrated in the example of FIG. 1, or can be accomplished indirectly, e.g., as illustrated in the example of FIG. 2.

At step 540, the application controls a timing of the measurement of the performance indicator and the sending of the reports to the server. This is accomplished according to the rate of reporting indicated at step 530. The indication of the rate of reporting may be applicable for a subgroup of wireless communication devices executing the application. In this case, the application accomplishes the control of the timing of step 530 in response to determining that the wireless communication device is a member of the subgroup to which the indication of the rate of reporting is applicable.

The subgroup may be defined according to a location of the wireless communication devices of the subgroup. The location may be defined, e.g., in terms of cell ID, time zone, geographical coordinates, geographical region, or the like. In addition or alternatively, the subgroup may be defined according to a type of operating software of the wireless communication device, optionally also according to the version of the operating software. In addition or alternatively, the subgroup may be defined according to a radio channel quality experienced by the wireless communication device. In addition or alternatively, the subgroup may be defined according to a radio technology type utilized by the wireless communication device providing the report. Such radio technology types may for example be LTE, UMTS, GSM, GPRS, CDMA2000, or WLAN or other non-3GPP wireless technologies. In addition or alternatively, the subgroup may be defined according to an operator of a wireless communication network utilized by the wireless communication device. Again, it is to be understood that such radio connectivity related information typically pertains to a radio connection which is utilized for downlink or uplink communication by the application. In addition or alternatively, the subgroup may be defined according to a device type of the wireless communication device providing the report, e.g., in terms of a device designation, manufacturer designation, model number, and/or device category defined by device transmission capabilities or the like.

The methods of FIGS. 4 and 5 may be used in combination, e.g., in a system which includes at least the server and the wireless communication devices. In such system the server would operate according to the method of FIG. 4, and each of the wireless communication devices would operate according to the method of FIG. 5.

Figure 6:
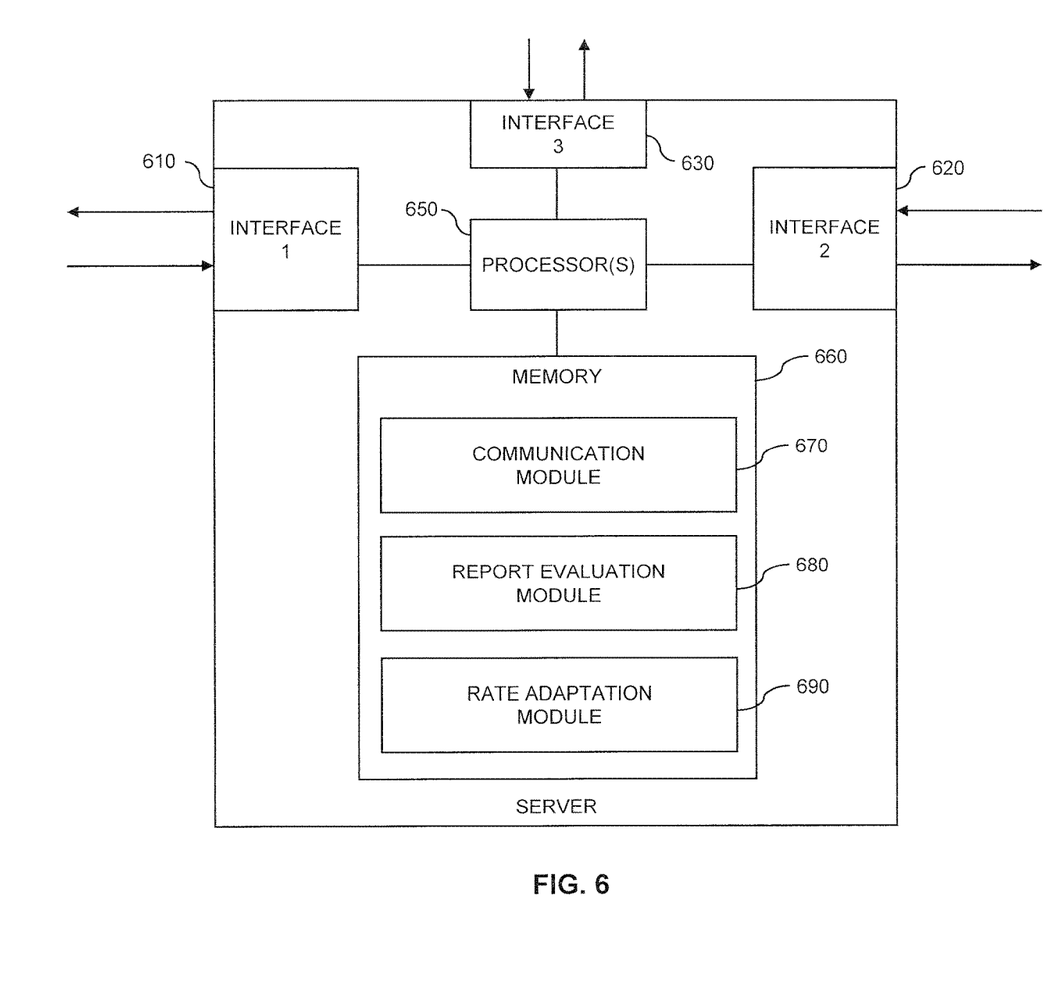
FIG. 6 schematically illustrates structures of a server according to an embodiment of the invention.

FIG. 6 illustrates exemplary structures of a server which may be used for implementing the above concepts. For example, the illustrated structures may be used to implement the AMS 150.

In the illustrated example, the server includes a first interface 610 for communication with a plurality of wireless communication devices, e.g., the wireless communication devices 100. Further, the server may include a second interface for communication with an application server of the application subject to performance monitoring, e.g., the AS 120. Still further, the server may include a third interface for communication with one or more measurement servers of wireless communication networks, such as the RMS 250.

Further, the server includes one or more processor(s) 650 coupled to the interfaces 610, 620 and 630, and a memory 660 coupled to the processor(s) 650. The memory 660 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 660 includes suitably configured program code modules to be executed by the processor(s) 650 so as to implement the above-described functionalities of the server. More specifically, the program code modules in the memory 660 may include a communication module 670 so as to implement the above-described functionalities of receiving reports and sending indications, which may be accomplished via one or more of the interfaces 610, 620, 630. Further, the program code modules in the memory 660 may include a report evaluation module 680 so as to implement the above-described functionalities of determining subgroups according to information in the meta data or measuring the rates at which the reports are received by the server. Still further, the memory 660 may include a rate adaptation module 690 so as to implement the above-described functionalities of determining reporting rates to be applied by the wireless communication devices.

It is to be understood that the structures as illustrated in FIG. 6 are merely schematic and that the server may actually include further components which, for the sake of clarity, have not been illustrated, e.g., further interfaces or further processors. Also, it is to be understood that the memory 660 may include further types of program code modules, which have not been illustrated, e.g., program code modules for implementing known functionalities of a server for collecting and/or evaluating performance indicators. In some implementations, also a computer program may be provided for implementing functionalities of the server, e.g., in the form of a physical medium storing the program code modules to be stored in the memory 660 or by making such program code modules available for download.

Figure 7:
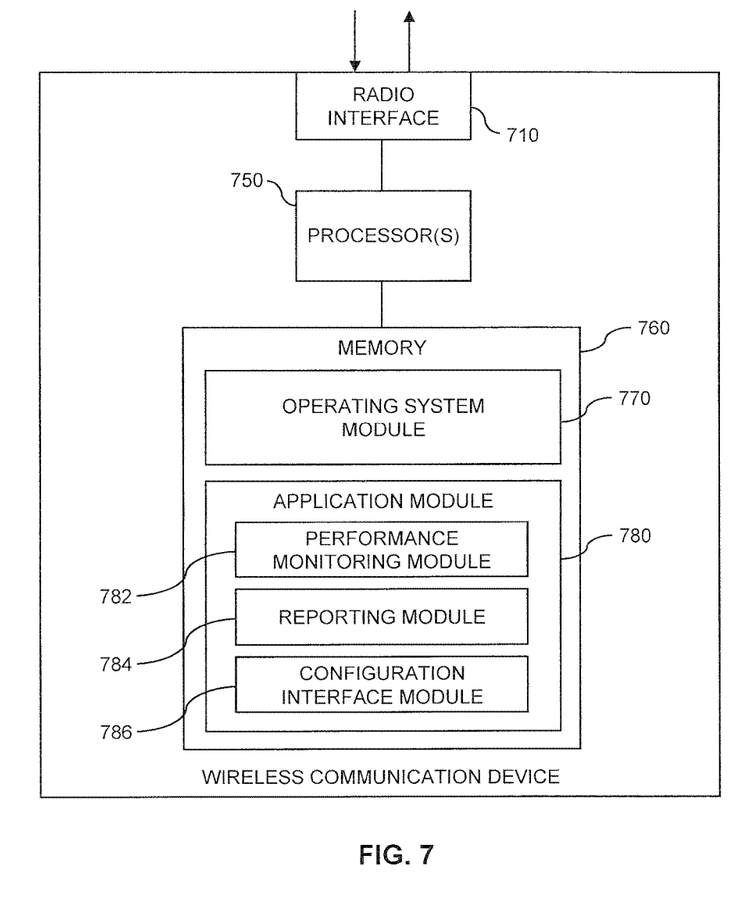
FIG. 7 schematically illustrates structures of a wireless communication device according to an embodiment of the invention.

FIG. 7 illustrates exemplary structures of a wireless communication device which may be used for implementing the above concepts. For example, the illustrated structures may be used to implement one of the client devices 100.

In the illustrated example, the wireless communication device includes a radio interface 710 for connecting to one or more wireless communication networks. The interface 710 may also be used for communication with one or more servers, e.g., using an Internet Protocol (IP) connection established via a wireless communication network. For example, such servers may correspond to the AS 120 and the AMS 150.

Further, the wireless communication device includes one or more processor(s) 750 coupled to the interface 710 and a memory 760 coupled to the processor(s) 750. The memory 760 may include a ROM, e.g., a flash ROM, a RAM, e.g., a DRAM or SRAM, a mass storage, e.g., a hard disk or solid state disk, or the like. The memory 760 includes program code modules to be executed by the processor(s) 750 so as to implement the above-described functionalities of the wireless communication device. More specifically, the program code modules in the memory 760 may include an operating system module 770 which includes the operating software of the wireless communication device. This operating software also provides an environment for executing applications on the wireless communication device. Further, the program code modules in the memory 760 may include an application module 780 which includes program code of the application which is subject to performance monitoring. The application module includes several submodules. These submodules may include a performance monitoring module 782 for implementing the above-described functionalities of measuring the performance indicator. Further, these submodules may include a reporting module 784 for implementing the above-described functionalities of sending the reports of the performance indicator. Further, these submodules may include a configuration interface module 786 for implementing the above-described functionalities of configuring the rate of reporting the performance indicator according to the indication received from the server.

It is to be understood that the structures as illustrated in FIG. 7 are merely schematic and that the wireless communication device may actually include further components which, for the sake of clarity, have not been illustrated, e.g., a user interface, further communication interfaces, or further processors. Also, it is to be understood that the memory 760 may include further types of program code modules, which have not been illustrated, e.g., program code modules for implementing known functionalities of a wireless communication device. In some implementations, also a computer program may be provided for implementing functionalities of the wireless communication device, e.g., in the form of a physical medium storing one or more of the program code modules to be stored in the memory 760, in particular the program code of the application, or by making such program code modules available for download.

As can be seen, the concepts as described above may be used for efficiently monitoring the performance of an application which is executed on a plurality of wireless communication devices. In particular, the concepts may be used for adapting the rate of reporting the performance indicator in such a way that a sufficient data basis of evaluations is obtained, while at the same time excessive measurements and reporting can be avoided.

It is to be understood that the examples and embodiments as explained above are merely illustrative and susceptible to various modifications. For example, the illustrated concepts could be used in connection with various types of applications, wireless communication networks, and wireless communication devices. Further, the concepts could also be applied to the reporting of multiple different performance indicators, with individual adaptation of the reporting rate for each of such performance indicators. Still further, various transmission modes and protocols may be used for conveying the reports and indications of reporting rate between the server and the wireless communication devices.

The invention claimed is:

1. A method of performance monitoring, the method comprising:
a server receiving reports of a performance indicator of an application as measured by the application executed on a plurality of wireless communication devices, the application interacting with an application server, the performance indicator being based on performance monitoring at an application level of transactions in which data are transmitted between the application server and the application;
on the basis of the received reports, the server determining a rate at which the performance indicator is to be reported; and
the server sending an indication of the determined rate to the application executed on at least some of the wireless communication devices.

2. The method according to claim 1, wherein the server determines the rate with respect to a subgroup of the wireless communication devices and indicates the rate to the application executed on the wireless communication devices of the subgroup.

3. The method according to claim 1, wherein each report comprises meta data related to the wireless communication device providing the report.

4. The method according to claim 3, wherein the server determines the rate with respect to a subgroup of the wireless communication devices and indicates the rate to the application executed on the wireless communication devices of the subgroup, and wherein the server determines the subgroup on the basis of the metadata indicated in the received reports.

5. The method according to claim 3, wherein the metadata comprise an indication of at least one of:
a location of the wireless communication device providing the report;
a type of operating software of the wireless communication device providing the report;
a radio technology type utilized by the wireless communication device providing the report;
an operator of a wireless communication network utilized by the wireless communication device providing the report; and
a device type of the wireless communication device providing the report.

6. The method according to claim 3, wherein the metadata comprise an indication of a radio channel quality experienced by the wireless communication device providing the report.

7. The method according to claim 1, comprising:
the server measuring a rate at which the reports are received by the server;
the server comparing the measured rate to a target rate; and
the server determining the rate of reporting depending on the comparison of the measured rate and the target rate.

8. The method of claim 1, wherein the server is implemented separately from than the application server.

9. A method of performance monitoring, the method comprising:
an application executed on a wireless communication device and interacting with an application server monitoring a performance of transactions in which data are transmitted between the application server and the application;
the application measuring a performance indicator of the application, the performance indicator being based on the monitoring, at an application level, of the performance of the transactions;
the application sending reports of the performance indicator to a server;
the application receiving from the server an indication of a rate at which the performance indicator is to be reported; and
according to the indicated rate, the application controlling a timing of said measuring the performance indicator and sending the reports to the server.

10. The method according to claim 9,
wherein the indication of the rate is applicable for a subgroup of wireless communication devices executing the application, and
wherein the application performs said controlling of the timing in response to determining that the wireless communication device is a member of the subgroup.

11. The method according to claim 10, wherein the subgroup is defined according to at least one of:
a location of the wireless communication devices of the subgroup;
a type of operating software of the wireless communication devices of the subgroup;
a radio technology utilized by the wireless communication devices of the subgroup;
an operator of a wireless communication network utilized by the wireless communication devices of the subgroup; and
a device type of the wireless communication devices of the subgroup.

12. The method according to claim 10, wherein the subgroup is defined according to a radio channel quality experienced by the wireless communication devices of the subgroup.

13. The method according to claim 9, wherein the reports each comprise metadata related to the wireless communication device.

14. The method according to claim 13, wherein the metadata comprise an indication of at least one of:
a location of the wireless communication device;
a type of operating software of the wireless communication device;
a radio technology type utilized by the wireless communication device;
an operator of a wireless communication network utilized by the wireless communication device; and
a device type of the wireless communication device.

15. The method according to claim 13, wherein the metadata comprise an indication of a radio channel quality experienced by the wireless communication device.

16. The method of claim 9, wherein the server is implemented separately from the application server.

17. The method of claim 9, wherein the performance indicator indicates a performance of an upload by the application.

18. The method of claim 9, wherein the performance indicator indicates a performance of a download by the application.

19. A server, comprising:
an interface for communication with a plurality of wireless communication devices; and
at least one processor and a memory, the memory containing instructions executable by the at least one processor whereby the server is configured to:
receive reports of a performance indicator of an application as measured by the application executed on the wireless communication devices, the application interacting with an application server, the performance indicator being based on performance monitoring at an application level of transactions in which data are transmitted between the application server and the application;
on the basis of the received reports, determine a rate at which the performance indicator is to be reported; and
send an indication of the determined rate to the application executed on at least some of the wireless communication devices.

20. The server according to claim 19, wherein the memory contains instructions executable by the at least one processor whereby the server is configured to determine the rate of reporting with respect to a subgroup of the wireless communication devices and indicate the rate to the application executed on the wireless communication devices of the subgroup.

21. The server according to claim 19, wherein each report comprises metadata related to the wireless communication device providing the report.

22. The server according to claim 21, wherein the memory contains instructions executable by the at least one processor whereby the server is configured to determine the rate with respect to a subgroup of the wireless communication devices, on the basis of the metadata indicated in the received reports, and indicate the rate to the application executed on the wireless communication devices of the subgroup.

23. The server according to claim 21, wherein the metadata comprise an indication of at least one of:
a location of the wireless communication device providing the report;
a type of operating software of the wireless communication device providing the report;
a radio technology type utilized by the wireless communication device providing the report;
an operator of a wireless communication network utilized by the wireless communication device providing the report; and
a device type of the wireless communication device providing the report.

24. The server according to claim 21, wherein the metadata comprise an indication of a radio channel quality experienced by the wireless communication device providing the report.

25. The server according to claim 19, wherein the memory contains instructions executable by the at least one processor whereby the server is configured to:
measure a rate at which the reports are received by the server;
compare the measured rate to a target rate; and
determine the rate depending on the comparison of the measured rate and the target rate.

26. The server of claim 19, wherein the server is implemented separately from the application server.

27. A wireless communication device, comprising:
a memory storing program code of an application; and
at least one processor configured to execute the program code of the application, and interacting with an application server monitoring a performance of transactions in which data are transmitted between the application server and the application, thereby causing the at least one processor to:
measure a performance indicator of the application, the performance indicator being based on the monitoring, at an application level, of the performance of the transactions;
send reports the performance indicator to a server;
receive from the server an indication of a rate at which the performance indicator is to be reported; and
according to the indicated rate, control a timing of said measuring the performance indicator and sending the reports to the server.

28. The wireless communication device according to claim 27,
wherein the indication of the rate is applicable for a subgroup of wireless communication devices executing the application, and
wherein said execution of the program code of the application causes the at least one processor to perform said controlling of the timing in response to determining that the wireless communication device is a member of the subgroup.

29. The wireless communication device according to claim 28, wherein the subgroup is defined according to at least one of:
a location of the wireless communication devices of the subgroup;
a type of operating software of the wireless communication devices of the subgroup;
a radio technology utilized by the wireless communication devices of the subgroup;
an operator of a wireless communication network utilized by the wireless communication devices of the subgroup; and
a device type of the wireless communication devices of the subgroup.

30. The wireless communication device according to claim 28, wherein the subgroup is defined according to a radio channel quality experienced by the wireless communication devices of the subgroup.

31. The wireless communication device according to claim 27, wherein the reports comprise metadata related to the wireless communication device.

32. The wireless communication device according to claim 31, wherein the metadata comprise an indication of at least one of:
a location of the wireless communication device;
a type of operating software of the wireless communication device;
a radio technology type utilized by the wireless communication device;
an operator of a wireless communication network utilized by the wireless communication device; and
a device type of the wireless communication device.

33. The wireless communication device according to claim 31, wherein the metadata comprise an indication of a radio channel quality experienced by the wireless communication device.

34. The wireless communication device of claim 27, wherein the server is implemented separately from the application server.

* * * * *